US009403600B2

(12) United States Patent
Leland et al.

(10) Patent No.: US 9,403,600 B2
(45) Date of Patent: Aug. 2, 2016

(54) INTEGRATED THERMAL PROTECTION AND LEAKAGE REDUCTION IN A SUPERSONIC AIR INTAKE SYSTEM

(75) Inventors: Brad C. Leland, Lancaster, CA (US); Andrew J. Tworek, Lancaster, CA (US); Chan Cho, Valencia, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 1327 days.

(21) Appl. No.: 13/461,599

(22) Filed: May 1, 2012

(65) Prior Publication Data
US 2013/0291553 A1 Nov. 7, 2013

(51) Int. Cl.
B64D 33/02 (2006.01)
F02C 7/057 (2006.01)
(Continued)

(52) U.S. Cl.
CPC ............... B64D 33/02 (2013.01); F02C 7/057 (2013.01); F02C 7/141 (2013.01); F02C 9/18 (2013.01); F02K 1/30 (2013.01); F02K 7/10 (2013.01); B64D 2033/026 (2013.01); F05D 2220/80 (2013.01); F05D 2270/17 (2013.01);
(Continued)

(58) Field of Classification Search
CPC .......... F02C 7/057; F02C 7/141; F02C 7/042; F02C 7/04; F02C 7/185; F02C 7/18; F02C 7/045; F02C 9/18; F02C 6/08; F02K 1/30; F02K 1/10; F02K 7/10; F02K 7/12; F02K 7/14; F02K 7/16; F02K 7/141; B64D 2033/026; B64D 2033/024; B64D 2033/0206; B64D 2033/022; B64D 33/02; B64D 2033/205; B64D 2033/0456; B64D 2033/0286; F05D 2220/80; F05D 2270/17; Y02T 50/675; Y02T 50/671; Y02T 50/166; Y02T 50/168; Y02T 50/676; F01D 11/24; Y10T 137/1536; Y10T 137/0645; Y10T 137/0536
See application file for complete search history.

(56) References Cited

U.S. PATENT DOCUMENTS 2,589,945 A * 3/1952 Leduc ............................ 137/15.1
2,811,828 A * 11/1957 McLafferty ..................... 60/264
(Continued)

FOREIGN PATENT DOCUMENTS

EP 469825 A2 2/1992
EP 1013882 A2 6/2000
(Continued)

OTHER PUBLICATIONS

V.I. Golovitchev et al., "Some Trends in Improving Hypersonic Vehicles' Aerodynamics and Propulsion", Sweden.
(Continued)

Primary Examiner — William H Rodriguez
Assistant Examiner — Jared W Pike
(74) Attorney, Agent, or Firm — McDermott Will & Emery LLP

(57) ABSTRACT

An air intake system suitable for a supersonic vehicle is disclosed. The system includes a channel comprising an inlet and a side wall and a plenum coupled to the side wall. The plenum is configured to accept a flow of coolant. In certain embodiments, the coolant is the waste coolant from an onboard electronics cooling system. The system also includes a porous region in the side wall configured to allow a flow of bleed air from the channel through the porous region of the side wall into the plenum so as to aid the transition to supersonic flow. In certain embodiments, the flow of the bleed air is reduced at supersonic speeds by pressurization of the plenum with the coolant.

11 Claims, 3 Drawing Sheets

(51) Int. Cl.
  *F02K 1/30* (2006.01)
  *F02K 7/10* (2006.01)
  *F02C 9/18* (2006.01)
  *F02C 7/141* (2006.01)

(52) U.S. Cl.
  CPC .............. *Y02T50/671* (2013.01); *Y02T 50/675* (2013.01); *Y10T 137/0536* (2015.04)

(56) References Cited

U.S. PATENT DOCUMENTS

| | | | |
|---|---|---|---|
| 3,237,400 A | | 3/1966 | Kuhrt |
| 3,417,767 A | * | 12/1968 | Young ..................... F02C 7/042 137/15.2 |
| 3,643,676 A | * | 2/1972 | Limage et al. ............... 137/15.2 |
| 3,733,826 A | | 5/1973 | Wolf et al. |
| 3,799,475 A | * | 3/1974 | Mitchell et al. ............. 244/53 B |
| 3,808,833 A | | 5/1974 | Allen et al. |
| 3,911,260 A | * | 10/1975 | Dustin ........................... 700/282 |
| 4,275,857 A | * | 6/1981 | Bergsten ...................... 244/53 B |
| 5,012,640 A | | 5/1991 | Mirville |
| 5,149,018 A | * | 9/1992 | Clark ......................... 244/117 A |
| 5,167,117 A | | 12/1992 | Herzog et al. |
| 5,236,151 A | | 8/1993 | Hagle et al. |
| 5,272,870 A | | 12/1993 | Grieb et al. |
| 7,055,781 B2 | | 6/2006 | Behrens et al. |
| 7,232,093 B2 | | 6/2007 | Behrens et al. |
| 7,587,887 B2 | * | 9/2009 | Horiuchi et al. ................ 60/39.3 |
| 7,665,310 B2 | * | 2/2010 | Laborie ........................... 60/806 |
| 2002/0117581 A1 | | 8/2002 | Sanders et al. |
| 2005/0111965 A1 | | 5/2005 | Lowe et al. |
| 2006/0060702 A1 | | 3/2006 | Behrens et al. |
| 2006/0242941 A1 | | 11/2006 | Johnson |
| 2007/0018038 A1 | * | 1/2007 | Jarmon et al. .................. 244/59 |
| 2008/0217481 A1 | * | 9/2008 | Janeke ....................... 244/159.3 |
| 2009/0072047 A1 | * | 3/2009 | Greene .................. B64D 33/04 239/127.3 |
| 2011/0133026 A1 | | 6/2011 | Behrens et al. |

FOREIGN PATENT DOCUMENTS

| | | |
|---|---|---|
| EP | 1705340 A2 | 9/2006 |
| GB | 2217788 A | 11/1989 |
| JP | 9-014053 | 1/1997 |

OTHER PUBLICATIONS

Ping Dai et al., "Numerical Study on film cooling effectiveness from shaped and crescent holes", Heat Mass Transfer, 2011.

O'Grady, "Jet Impingement Cooling of Turbine Blades by Forced Convection," University of California, San Diego, Dec. 2007.

* cited by examiner

INTEGRATED THERMAL PROTECTION AND LEAKAGE REDUCTION IN A SUPERSONIC AIR INTAKE SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

1. Field

The present disclosure generally relates to air intake ducting of supersonic propulsion systems and, in particular, to cooling of the engine air intakes of hypersonic vehicles.

2. Description of the Related Art

The air intakes of high-speed vehicles benefit from removal of the boundary layer in order to achieve higher thrust. One conventional approach to boundary layer removal uses an intake "bleed" system in the inlet surface which allows the boundary layer to flow though the surface and be collected into a plenum. This bleed air is then ducted overboard. At very high speeds, the stagnant bleed air in the plenum becomes very hot as the kinetic energy of the high-speed air is converted to heat as the air is slowed within the plenum. At speeds above Mach 4, these temperatures may exceed the temperature limit of most materials. As a result, conventional high-speed intake systems do not include bleed systems.

Vehicles using air-breathing engines that initially fly at subsonic speeds and then accelerate to supersonic flight speeds must use air intakes that can accept the supersonic shock wave that enters the air intake during the transition from subsonic to supersonic flight. Allowing the shock wave to travel from the inlet aperture to the intake throat is referred to as "swallowing" the supersonic flow and is necessary to "start" supersonic operation. To accomplish the "starting" process requires a relatively large amount of air to be bled off of the air intake during the subsonic flow. As allowing this same amount of air to bleed off during supersonic flow reduces the efficiency of the engine, active bleed control systems, referred to as "educated bleed slots," are used in conventional systems to adjust the amount of air that is bleeding off of the air intake. The disadvantage of active bleed control systems is the increased complexity and weight and reduction in reliability that are inherent in adding moving elements and actuators to a system.

SUMMARY

Some missiles, such as the Long Range Strike Weapon being developed by Lockheed Martin, may be launched from aircraft flying at subsonic speeds and then accelerate to supersonic or hypersonic flight speeds. The weight of an air vehicle and the efficiency of its propulsion system at supersonic speed both affect the range and/or payload capacity. Reliability is also an important aspect of performance and any additional moving components or actuators may decrease the overall reliability of the air vehicle. There is a need to provide a lightweight and reliable system that varies the flow characteristics of an engine intake as the air vehicle transitions from subsonic to supersonic flight speeds without the use of moving elements or actuators.

At supersonic or hypersonic speeds, aerodynamic friction heats the skin of the air vehicle to temperatures of as much as 1200° F. while the operational temperature of internal components, such as electronics, may be limited to a lower temperature, such as 200° F. For some systems, this cooling is provided by a flow of cooling fluid from an on-board source, for example a bottle of compressed gas, that is continuously being expanded, thereby reducing the temperature of the expanded gas. The resulting cold gas coolant is directed to the internal component to be cooled and then the warmed waste coolant is ducted overboard. In other systems, a flow of a liquid coolant, such as water, is directed to the internal component to be cooled. The liquid vaporizes thus absorbing heat and the resulting waste gas is ducted overboard.

The need to an improved air intake adapted to make the transition from subsonic to supersonic operation and achieve improved efficiency at supersonic speeds is met by the disclosed embodiments of the disclosed air intake system that includes a plenum positioned adjacent to the air intake with bleed holes from the air intake and an exhaust port on an exterior surface of the vehicle. The plenum receives the waste coolant from an on-board cooling system. As the temperature of the waste coolant is lower than the temperature of the bleed air that entered the plenum from the intake, mixing of the waste coolant with the bleed air in the plenum maintains the temperature of the mixture of gases within the plenum below an operating temperature limit.

In certain embodiments, an air intake system suitable for a supersonic vehicle is disclosed. The system includes a channel comprising an inlet and a side wall and a plenum coupled to the side wall. The plenum is configured to accept a flow of coolant. The system also includes a porous region in the side wall configured to allow a flow of bleed air from the channel through the porous region of the side wall into the plenum.

In certain embodiments, an air intake system for an engine of a supersonic vehicle is disclosed. The system includes a channel comprising an inlet and a side wall. The channel is configured to accept a flow of air and direct the flow of air to the engine. The system also includes a plenum coupled to the side wall, a porous region in the side wall configured to bleed off a portion of the air flowing through flow channel through the porous region into the plenum, and a selectable flow of coolant into the plenum. Coolant does not flow into the plenum while air is flowing through the channel at a subsonic speed. Coolant does flow into the plenum while air is flowing through the channel at a supersonic speed.

In certain embodiments, a vehicle is disclosed that includes an air-breathing engine and a channel comprising an inlet and a side wall. The channel is configured to accept a flow of air through the inlet and direct the flow of air to the engine. The vehicle also includes a plenum coupled to the side wall, a porous region in the side wall configured to bleed off a portion of the air flowing through flow channel through the porous region into the plenum, and a selectable flow of coolant into the plenum. Coolant does not flow into the plenum while air is flowing through the channel at a subsonic speed. Coolant does flow into the plenum while air is flowing through the channel at a supersonic speed.

In certain embodiments, a method of protecting an air intake system on a supersonic vehicle is disclosed. The method includes the steps of accepting a flow of air having a subsonic velocity and directing the flow of air through a channel to an engine, bleeding off a portion of the air flowing through the channel through a porous portion of a side wall of the channel into a plenum. The portion is sufficient to allow the air flowing through the channel to transition from the subsonic velocity to a supersonic velocity. The method also includes the steps of initiating by a processor a flow of coolant into the plenum starting after the air flowing through the channel reaches supersonic velocity.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

The embodiments and methods disclosed herein are presented in terms of an exemplary air intake for an air-breathing supersonic missile adapted to be carried by an aircraft. It will be obvious to those of skill in the art that the same concepts may be applied to other types of supersonic air vehicles carried by ships or ground vehicles or launched from stationary ground systems. In addition, the concepts disclosed herein may be applied to intake system for other purposes that providing air to a propulsion engine, such as an air intake of a fresh air intake system for a manned vehicle traveling at supersonic speed. Furthermore, the concepts may be applied to vehicles that are traveling at supersonic speed in a near vacuum, i.e. at an atmospheric pressure too low to support a shock wave, and must transition to travel in an atmospheric environment with sufficient pressure to support a shock wave and then initiate an air-breathing propulsion system. Nothing in this disclosure shall be interpreted to limit the scope of the disclosed concepts to an engine air intake system unless explicitly stated as such.

In the following detailed description, numerous specific details are set forth to provide a full understanding of the present disclosure. It will be apparent, however, to one ordinarily skilled in the art that embodiments of the present disclosure may be practiced without some of the specific details. In other instances, well-known structures and techniques have not been shown in detail so as not to obscure the disclosure.

Within this disclosure, the term "supersonic" shall be interpreted to indicate a velocity relative to a reference point of greater than the "speed of sound" with respect to reference frame fixed at the reference point. For example, a vehicle may be flying through still air at a supersonic velocity relative to that air, while that same air entering an intake channel would have a supersonic velocity relative to the walls of the channel. In addition, the absolute velocity of sound in air may vary, for example according to the temperature and pressure of the air, and therefore the absolute velocity associated with the "speed of sound" may vary and the determination of whether a velocity is supersonic shall be made relative to the "speed of sound" under the instantaneous conditions at the reference point.

The term "Mach" is sometimes used to state a velocity as a multiple of the "speed of sound." For example, the phrase "Mach 2" would be approximately twice the "speed of sound." Within this disclosure, a Mach number is to be interpreted with reference to the "speed of sound" under the instantaneous conditions at the reference point.

The term "hypersonic" is sometimes used to indicate velocities at or above Mach 5. The term "supersonic" shall be interpreted within this disclosure as inclusive of hypersonic velocities.

Figure 1:
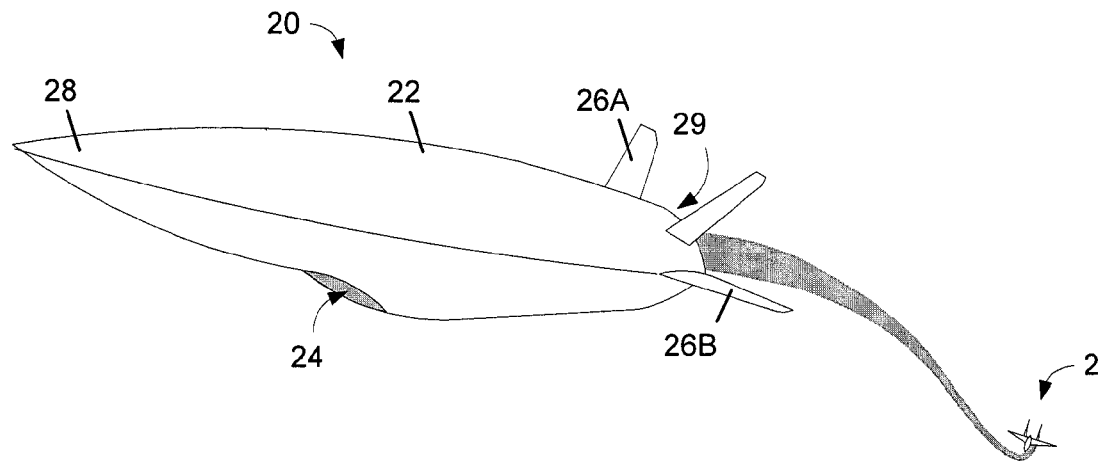
FIG. 1 depicts an exemplary supersonic vehicle with an air-breathing propulsion system according to certain aspects of the present disclosure.

FIG. 1 depicts an exemplary supersonic vehicle 20 with an air-breathing propulsion system 29 (not visible in FIG. 1) according to certain aspects of the present disclosure. The vehicle 20 has a hull 22 within which is mounted an electronics package 28. The propulsion system 29 takes in air through inlet 24. The details of the air intake system are discussed in greater detail with respect to FIGS. 2 and 3. The vehicle 20 is steered using one or more fins such as the example pair of vertical fins 26A and pair of horizontal fins 26B (the second horizontal fin is not visible in FIG. 1). In the embodiment depicted in FIG. 1, the vehicle 20 is launched from an aircraft 2. In certain embodiments, the vehicle 20 is launched from a ship. In certain embodiments, the vehicle 20 is launched from a ground vehicle, such as a truck. In certain embodiments, the vehicle 20 is launched from a mobile or fixed ground-based installation. In certain embodiments, the vehicle 20 takes off from either a ground-based or ship-based runway. In certain embodiments, the vehicle 20 is an unmanned autonomous vehicle. In certain embodiments, the vehicle 20 is teleoperated, i.e. receiving command signals from a remote human operator. In certain embodiments, the vehicle 20 is a manned vehicle.

In certain embodiments, the vehicle 20 is launched from the aircraft 2 while the aircraft 2 is flying at a subsonic velocity. The propulsion system 29 draws in air at the velocity of the vehicle 20, i.e. air is initially entering the inlet 24 at a subsonic velocity relative to the vehicle 20. As the vehicle 20 accelerates, the velocity of the vehicle 20, and therefore the velocity of the air entering the inlet 24, will reach and then exceed the speed of sound and thereafter the vehicle travels at a supersonic velocity. As the vehicle 20 makes this transition from subsonic to supersonic velocity, a shock wave forms at the inlet 24. For the propulsion system 29 to transition to stable supersonic operation, the shock wave formed at the inlet 24 must travel through the air intake system to the propulsion system 29, a process referred to as "swallowing" the shock wave. This is discussed in greater detail with respect to FIG. 3.

As the range and payload capacity of the vehicle 20 depend on the efficiency of the propulsion system 29 while at supersonic speed, since the vehicle 20 may operate primarily at supersonic speeds, it is desirable to reduce the weight of every component and subsystem on the vehicle 20 while increasing the efficiency of the supersonic operation of the propulsion system 29.

Figure 2:
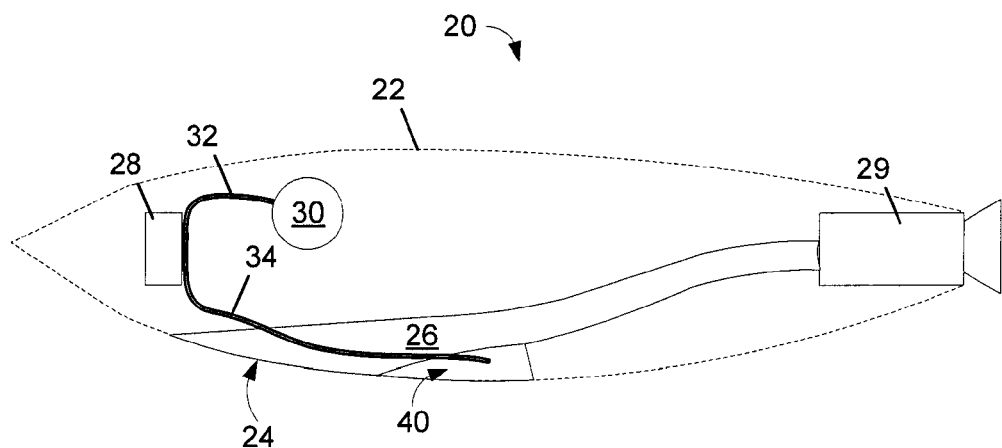
FIG. 2 is a schematic diagram of certain components of the vehicle of FIG. 1 according to certain aspects of the present disclosure.

FIG. 2 is a schematic diagram of certain components of the vehicle 20 of FIG. 1 according to certain aspects of the present disclosure. The hull 22 is shown as a dash-line outline. The propulsion system 29 is located, in this example, at the rear of the vehicle 20. In certain embodiments, the propulsion system 29 is a jet engine. In certain embodiments, the propulsion system 29 is a ramjet engine. In certain embodiments, the propulsion system 29 is a turbine engine. The inlet 24 is located on a forward surface of the hull 22 so as to aid in guiding air into the inlet 24. The air entering inlet 24 is guided through an air channel 26, also referred to as an air intake, to the propulsion system 29. This air channel 26 is not shown to scale or with realistic shape and is presented only schematically as a flow path from the inlet 24 to the propulsion system 29. A plenum is located adjacent to a portion of the air channel 26 and shares a side wall with the channel 26. The details of the plenum 40 are discussed in greater detail with respect to FIG. 3.

In this example, an electronics package 28 is mounted within the hull 22 at a front end of the vehicle 20. This electronics package 28 must be maintained within a defined operational temperature range, for example −40° F. to +200° F. As the hull temperature may reach a temperature, for example 1200° F., that is in excess of this range, the electronics package 28 must be cooled while the vehicle 20 is flying. In this embodiment, a tank 30 of coolant is disposed within the hull 22. In certain embodiments, the coolant in the tank 30 is a compressed gas, wherein continuous expansion of a small amount of the compressed gas, which cools the gas, produces a flow of a coolant. In certain embodiments, the coolant in the tank 30 is a pressurized liquid, such as tetrafluoroethane, wherein continuous expansion of a small amount of the pressurized liquid allows the liquid to convert into a cold gas thereby producing a flow of a coolant. In certain embodiments, the coolant in the tank 30 is an unpressurized liquid, such as water or ethylene glycol, and a continuous flow of the liquid from the tank 30 provides the flow of coolant. In this example, a flow of a liquid coolant is directed from the tank 30 through line 32 to the electronics package 28 and then through line 34 into the plenum 40. In certain embodiments, the vehicle 20 includes a flow valve 56 (not shown) in line 34 that can direct the flow of coolant either into the plenum 40 or through a secondary line 58 (not shown) out through the hull 22. In certain embodiments, the vehicle 20 includes a processor 50 (not shown) coupled to the flow valve 56 so as to configure the valve 56 to direct the coolant to either the plenum 40 or overboard. The valve 56 and processor 50 are discussed in greater detail with respect to FIG. 4.

Figure 3:
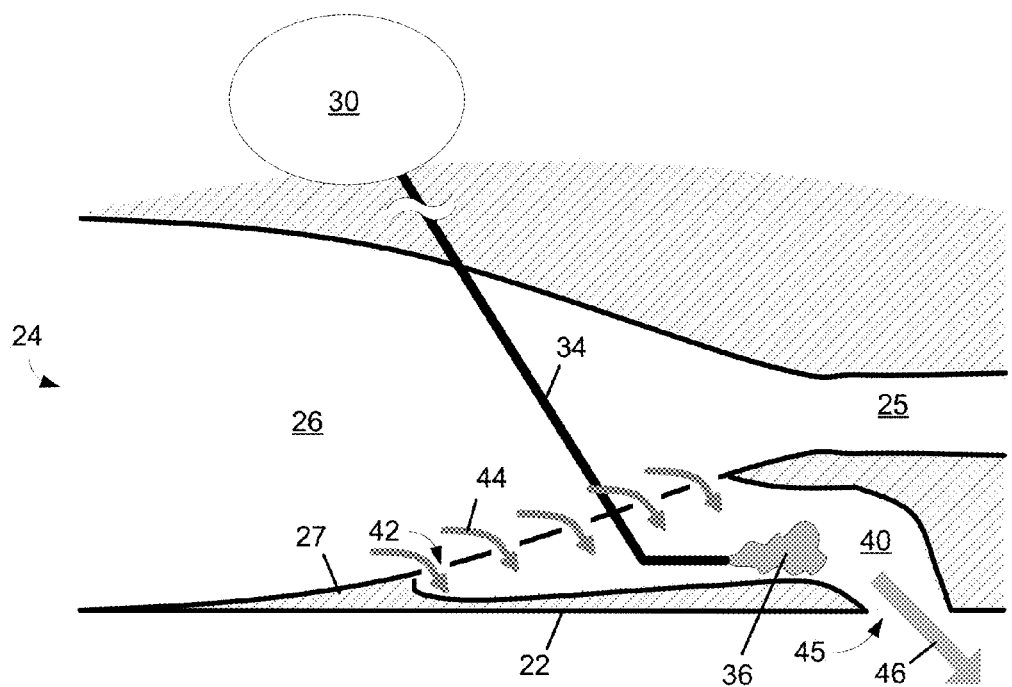
FIG. 3 is an enlarged view of an exemplary air intake according to certain aspects of the present disclosure.

FIG. 3 is an enlarged view of an exemplary air channel 26, according to certain aspects of the present disclosure. The air channel 26 has an inlet 24 at one end and a throat 25 at the other end, wherein air enters the inlet 24 at a velocity close to the velocity of the vehicle 20 relative to the external atmosphere and flows through the air channel 26 to the throat 25. The plenum 40 is shown as coupled to a side wall 27 of the air channel 26. In certain embodiments, the plenum 40 wraps around a portion of the air channel 26 such that the plenum 40 is coupled to more than one side wall 27. In certain embodiments, there are a plurality of plenums 40 respectively coupled to one of side walls 27 of the air channel 26. A region of the side wall 27 that is coincident with the plenum is porous, i.e. allows air to pass through the side wall 27. In certain embodiments, a plenum is coupled to each sidewall 27 of the air channel 26 so as to remove a boundary layer from the entire perimeter of the air flow through the air channel 26. In the embodiment depicted in FIG. 3, the porous region of side wall 27 comprises a plurality of holes 42 through the side wall 27, wherein the holes 42 are configured to allow an airflow 44 from the air channel 26 through the holes 42 into the plenum 40. The plenum 40 comprises an outlet 45 disposed in the hull 22 configured to allow an airflow 46 from the plenum 40 out through the outlet 45 to the external atmosphere.

In this example, the line 34 carrying the warmed coolant from the electronics package 28 terminates in the plenum 40 such that a flow of coolant 36 is provided into the plenum 40. The line 34 and the position and configuration of the termination of line 34 are not shown to scale or with realistic shape and are presented only schematically to indicate the introduction of the coolant 36 into the plenum 40. In certain embodiments, the termination of line 34 is positioned proximate to the holes 42 so as to immediately mix the coolant 36 with the airflow 44 entering the plenum through the holes 42. In certain embodiments, the termination of line 34 is a manifold with multiple openings, for example to improve the mixing of the coolant 36 with the airflow 44.

In certain embodiments, the coolant 36 is provided from a dedicated source, i.e. a source of coolant used only to cool the plenum 40. This is effective at producing the same effects of cooling the bleed air 44 and increasing the pressure within the plenum 40, at a cost of additional weight and complexity of the overall vehicle 20. This maybe an acceptable tradeoff in certain circumstances and the use of a dedicated source of coolant does not depart from the spirit and scope of the present disclosure.

As previously discussed with respect to FIG. 1, a shock wave forms at the inlet 24 as the vehicle 20 accelerates from subsonic to supersonic velocity. For the propulsion system 29 to transition to stable operation, the shock wave formed at the inlet 24 must travel through the air channel 26 to the throat 25, a process referred to as "swallowing" the shock wave. If the inlet 24 and air channel 26 are sized for supersonic operation, there is too much air flowing through the channel at subsonic speeds to make this transition and the shock wave may not remain within the throat 25, thereby causing instabilities in the air channel 26. Air must be bled off from the air channel 26 to allow the shock wave to pass through the channel 26 and into the throat 25. The bleed holes 46 must therefore be sized to enable the air flowing through the air channel 26 to make the transition from subsonic to supersonic velocity to allow the engine of propulsion system 29 to "start" supersonic operation, i.e. for the shock wave to travel through the air channel 26 to the throat 25.

Once the air flowing through the channel 26 reaches supersonic velocity, it is still desirable to bleed off the boundary layer of the air flowing through air channel 26. However, the amount of bleed air 44 necessary to remove the boundary layer during supersonic operation is much less than the amount of air that must be bled off during subsonic operation, and therefore the bleed holes 46 that were sized to facilitate the transition from subsonic to supersonic operation are now oversized for efficient operation.

In addition, the supersonic air that passes through the porous region, i.e. the holes 42, into the plenum 40 heats up as the kinetic energy of the supersonic air 44 is converted to thermal energy in the relatively stationary air within the plenum 40. For example, the air in the plenum 40 may reach a temperature of 2000° F. in the absence of cooling and exceed the temperature limit, for example 1600° F., of the air intake system of the vehicle 20, possibly leading to a system failure.

At the same time, the coolant 36 coming from the electronics package 28, for example gaseous water produced by boiling of liquid water coolant at the electronics package 28, may be at a temperature of approximately 250° F. While this is warm compared to the maximum operational temperature of the electronics package 28, this is still far cooler than the 2000° F. of the air 44 entering the plenum 40. By mixing this 250° F. coolant 36 with the bleed air 44 in the plenum 40, the temperature of the resulting mixture 46 of air and coolant remains at or below a temperature that is less than the temperature limit of the air intake system, thus allowing the bleed air 44, i.e. the boundary layer being removed from the supersonic air flow in the air intake 26, without the cost, space, and weight penalties of a dedicated plenum cooling system.

In addition to cooling the bleed air 44, the introduction of the coolant 36 also raises the pressure within the plenum 40 compared to the pressure in the plenum 40 when coolant 36 is not being introduced. A higher pressure within the plenum 40 reduces the pressure gradient across the holes 42 and, therefore, will reduce the flow rate of the bleed air 44. As it is desirable to reduce the flow of bleed air 44 once the transition has been made to supersonic operation, the coolant is, in certain embodiments, selectively introduced into the plenum 40 only after the transition has been made. This reduction in bleed air flow 44 improves the efficiency of supersonic operation of the propulsion system 29.

Figure 4:
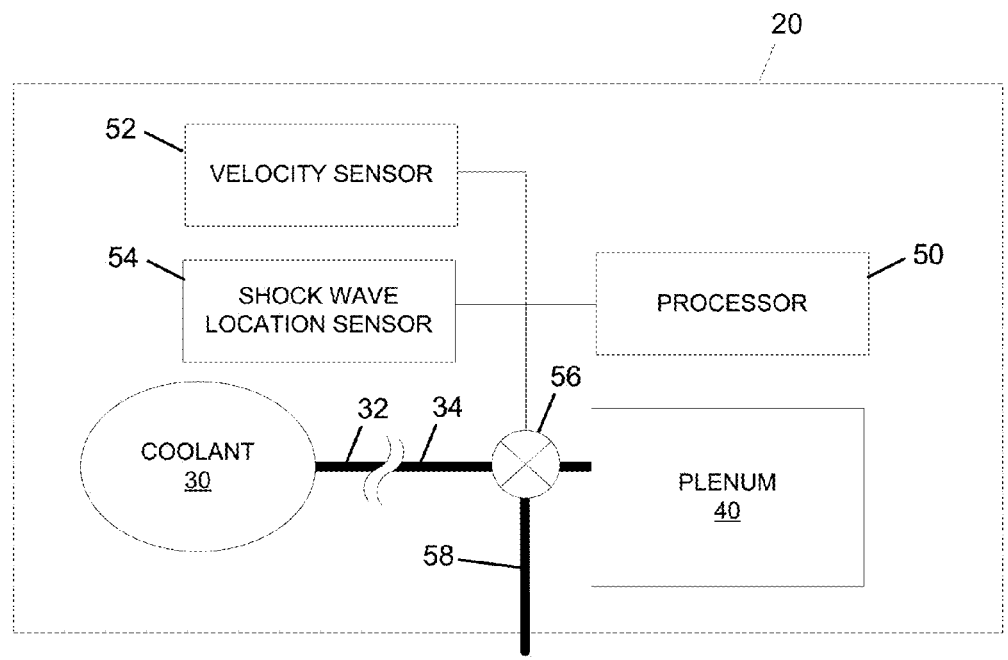
FIG. 4 is a block diagram of certain components of the vehicle of FIG. 1 according to certain aspects of the present disclosure.

FIG. 4 is a block diagram of certain components of the vehicle 20 of FIG. 2 according to certain aspects of the present disclosure. The block diagram depicts the valve 56 that can selectively direct the coolant flowing through line 34 to either the plenum 40 or through line 58 to the external atmosphere. The valve 56 is controlled by processor 50 which is also coupled, in certain embodiments, to one or more of a velocity sensor 52 and a shock wave location sensor 54. In certain embodiments, the shock wave location sensor 54 is disposed within the air intake system between the inlet 24 and the engine of the propulsion system 29. In certain embodiments, the velocity sensor 52 measures the velocity of the vehicle 20 in the atmosphere. In certain embodiments, the velocity sensor 52 measures the velocity of the air flowing past a point within the channel after the inlet 24. In certain embodiments, the shock wave location sensor 54 is disposed within the air intake system between the inlet 24 and the engine of the propulsion system 29. In certain embodiments, the shock wave location sensor 54 is a shock detector that determines that the shock wave is at the location of the sensor 54. In certain embodiments, the processor 50 is configured to actuate the valve 56 based on one or more of the signals from the velocity sensor 52 and the shock wave location sensor 54 so as to initiate flow of the coolant into the plenum 40.

Figure 5:
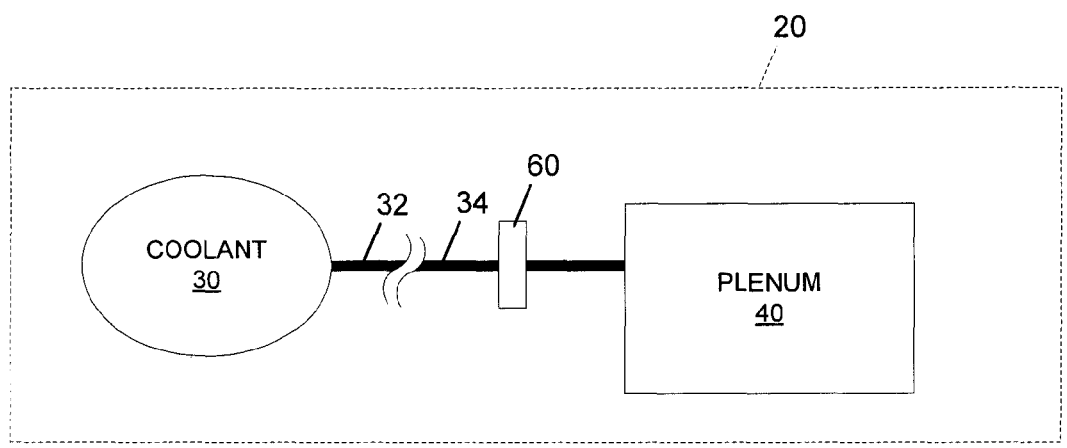
FIG. 5 is a block diagram of another embodiment of certain components of the vehicle of FIG. 1 according to certain aspects of the present disclosure.

FIG. 5 is a block diagram of another embodiment of certain components of the vehicle 20 of FIG. 1 according to certain aspects of the present disclosure. This embodiment is similar to that of FIG. 4, with the active components of the processor 50, sensors 52, 54, and valve 56 replaced by a mechanical flow controller 60. In certain embodiments, the flow controller 60 is a burst disk, known to those of skill in the art, or similar burstable seal configured to seal the line 34 while the pressure in the line 34 is less than a predetermined burst pressure of the burstable seal and to burst when the pressure in the line 34 exceeds the predetermined pressure and thereafter allow coolant to flow through the flow controller 60 and into the plenum 40.

In certain embodiments, the vehicle 20 includes a cooling system, of which the coolant tank 30 is a part, that is configured to absorb heat from the electronics package 28, visible in FIG. 2, without venting a flow of coolant for a first period of time and then initiating a flow of coolant to the plenum during a second period of time that follows the first period of time. In certain embodiments, the cooling system is configured such that the first period of time exceeds the time that it takes for the vehicle to accelerate to a supersonic velocity and for the air channel to swallow the shock wave. In certain embodiments, the coolant is allowed to flow into the plenum only after the air flowing through the air channel has transitioned to supersonic velocity.

The concepts disclosed herein provide a system and method for facilitating the transition in operation of an air intake system from subsonic to supersonic operation while also providing improved efficiency of the air intake system at supersonic speeds. In certain embodiments, the amount of bleed air removed from the air intake channel at supersonic speeds is sufficient to remove the boundary layer but reduced from the level of bleed air required to start the supersonic operation of the engine without the need for active systems or actuators. In certain embodiments, the disclosed system reduces the bleed air flow by pressurizing the plenum with coolant from an on-board cooling system. In certain embodiments, the system cools the bleed air using waste coolant from an on-board cooling system already present for cooling components of the vehicle, thereby maintaining the temperature of the mixture of air and coolant below the maximum operating temperature of the air intake system without the cost, space, and weight penalties of a dedicated plenum cooling system.

It will be apparent to those of skill in the art that the principles and apparatus disclosed herein maybe applied to other types of air intake systems that operate at supersonic speeds. In order to reduce the temperature of the plenum, the coolant may be any stream of fluid that is at a temperature below that of the bleed air and available for mixing with the bleed air and subsequent discharge to the external atmosphere. In order to pressurize the plenum, the coolant may be any source of fluid at a pressure above the pressure produced within the plenum by the bleed air during subsonic operation and available for mixing with the bleed air and subsequent discharge to the external atmosphere.

The previous description is provided to enable a person of ordinary skill in the art to practice the various aspects described herein. While the foregoing has described what are considered to be the best mode and/or other examples, it is understood that various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the terms "a set" and "some" refer to one or more. Pronouns in the masculine (e.g., his) include the feminine and neuter gender (e.g., her and its) and vice versa. Headings and subheadings, if any, are used for convenience only and do not limit the invention.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An air intake system for an engine of a supersonic vehicle, the system comprising:
   an air channel comprising an inlet and an outlet, the air channel comprising side walls, the air channel configured to accept a flow of air through the inlet and direct the flow of air through the outlet to the engine;
   a plenum coupled to at least one side wall of the air channel;
   an on-board cooling system configured to provide a flow of coolant into the plenum; and
   a porous region in the at least one side wall configured to bleed off a portion of the air flowing through the air channel through the porous region into the plenum;
   wherein the plenum is configured to accept a flow of coolant,
   wherein the cooling system is configured to provide coolant into the plenum when a flow of bleed air through the porous region is at a first flow rate, and configured not provide coolant into the plenum when the flow of bleed air through the porous region is at a second flow rate, the first flow rate being less than the second flow rate,
   wherein while coolant is not flowing, the porous region is configured to allow the portion of the air that is bled off through the porous region to be sufficient to allow the air channel to swallow a shock wave as the flow of air through the air channel transitions from a subsonic speed to a supersonic speed, and
   wherein the system further comprises a flow controller configured to initiate the flow of coolant after the air channel swallows the shock wave.

2. The system of claim 1, wherein, while coolant is not flowing into the plenum, the plenum is configured to allow a gas pressure in the plenum to be less than the gas pressure in the plenum while coolant is flowing into the plenum.

3. The system of claim 1, wherein the flow controller is configured to initiate the flow of coolant when a predetermined condition occurs.

4. The system of claim 1, wherein the flow controller is a burstable disk that allows the coolant to flow into the plenum when a pressure of the coolant upstream of the burstable disk exceeds a predetermined pressure.

5. The system of claim 1, wherein the flow controller is configured to initiate the flow of coolant when a predetermined time has passed.

6. A vehicle comprising:
   an air-breathing propulsion system;
   an air channel comprising an inlet and an outlet, the air channel comprising side walls, the air channel configured to accept a flow of air and direct the flow of air to the propulsion system;
   a plenum coupled to at least one side wall of the air channel; and
   a porous region in the at least one side wall configured to bleed off a portion of the air flowing through the air channel into the plenum; and
   a cooling system configured to provide a flow of coolant into the plenum, wherein the cooling system is further configured such that coolant does not flow into the plenum for a first period of time and does flow into the plenum for a second period of time that follows the first period of time,
   wherein the cooling system is configured to provide coolant into the plenum when a flow of bleed air through the porous region is at a first flow rate, and configured not provide coolant into the plenum when the flow of bleed air through the porous region is at a second flow rate, the first flow rate being less than the second flow rate, and
   wherein the cooling system does not provide coolant into the plenum when air is flowing through the air channel at subsonic speeds, and the cooling system does provide coolant into the plenum when air is flowing through the air channel at supersonic speeds.

7. The vehicle of claim 6, wherein, while the air is flowing through the air channel at subsonic speeds, the porous region is configured to allow the amount of the air that is bled off through the porous region to be sufficient to allow the air channel to swallow a shock wave as the air flow through the air channel transitions from subsonic speed to supersonic speed.

8. The vehicle of claim 6, wherein the cooling system further comprises a burstable seal that is configured to burst and allow the coolant to flow into the plenum.

9. The vehicle of claim 6, wherein the cooling system further comprises:
   a valve configured to selectively allow the flow of coolant into the plenum; and
   a processor coupled to the valve, the processor configured to control the valve.

10. A method of protecting an air intake system on a supersonic vehicle, the method comprising the steps of:
    accepting a flow of air having a subsonic velocity and directing the flow of air through an air channel to a propulsion system;
    bleeding off a portion of the air flowing through the air channel through a porous portion of a side wall of the air channel into a plenum wherein the bled off portion of the air is sufficient to allow the air flowing through the air channel to transition from the subsonic velocity to a supersonic velocity; and
    allowing a flow of coolant into the plenum after the air flowing through the air channel has transitioned to the supersonic velocity.

11. The method of claim 10, wherein the allowing a flow comprises initiating by a processor a flow of coolant into the plenum after the air flowing through the channel reaches supersonic velocity.

* * * * *